United States Patent Office

3,806,317
Patented Apr. 23, 1974

3,806,317
HAIR LACQUERS AND LOTIONS CONTAINING N-VINYLPYRROLIDONE COPOLYMERS
André Viout, Paris, and Christos Papantoniou, Epinay-sur-Seine, France, assignors to L'Oreal, Paris, France
No Drawing. Filed Mar. 31, 1970, Ser. No. 24,378
Int. Cl. A61k 7/10
U.S. Cl. 8—127.51
9 Claims

ABSTRACT OF THE DISCLOSURE

Hair lacquer and lotion compositions containing in a cosmetically acceptable vehicle or carrier a copolymer of: (1) 40–90% N-vinylpyrrolidone and 60–10% allyl ester, methallyl ester, vinyl ether and α-olefin, or (2) 40–90% N-vinylpyrrolidone, 5–40% allyl ester, methallyl ester, vinyl ether and α-olefin and 3–20% unsaturated monobasic carboxylic acid.

---

This invention relates to a novel hair set lacquer and lotion composition and more particularly to a hair set lacquer or lotion composition which contains a copolymer of N-vinylpyrrolidone with at least one other monomer selected from the group consisting of an allyl ester, a methallyl ester, a vinyl ether or an α-olefin. Alternatively, a further monomer comprising a monobasic unsaturated acid containing 4–11 carbon atoms can be employed in producing the copolymer.

Heretofore hair set lacquers and lotions have been produced using as the principal lacquering or setting ingredient a copolymer of N-vinylpyrrolidone with vinyl acetate, acrylic acid or an alkyl acrylate. Still other prior art hair set lacquers and lotions have been formulated with a terpolymer of N-vinylpyrrolidone, vinyl stearate and either vinyl acetate or an acrylic ester. It has also been known to employ in conventional hair set lacquers and lotions a polymer obtained by copolymerizing 80 to 95% N-vinyl ε-caprolactam with a vinyl ester, a methacrylate, an acrylate, an acrylamide or a vinyl ether.

While such polymers have been found to be advantageous over shellac based hair set lacquers and lotions which they replaced, such polymer based compositions exhibit certain disadvantages in that they did not exhibit to the degree desired such characteristics as film clarity, solubility in alcohol and water, film strength sufficient to control hair placement and film resiliency to permit the hair to be combed without undue breakage of the film.

It has now been found that the disadvantages of prior art hair set lacquers and lotions can be overcome, and especially the disadvantage of their poor solubility in alcohol or water, by the present invention, thereby significantly facilitating the removal of the residue of the hair set lacquer or lotion composition, when desired, by brushing or shampooing.

Thus, the novel hair set lacquer and lotion composition of this invention comprises a cosmetic vehicle and a film-forming copolymer of 40–90 weight percent N-vinylpyrrolidone and 60–10 weight percent of at least one monomer selected from the group consisting of an allyl ester, a methallyl ester, a vinyl ether and an α-olefin.

As an alternative embodiment of the present invention the hair set lacquer and lotion composition comprises a cosmetic vehicle and a film-forming copolymer of 40–90 weight percent N-vinylpyrrolidone, 5–40 weight percent of at least one of a first monomer selected from the group consisting of allyl ester, a methallyl ester, a vinyl ether and an α-olefin and 3–20 weight percent of a second monomer consisting of a monobasic unsaturated carboxylic acid containing 4–11 carbon atoms.

The copolymers of the present invention are prepared by conventional polymerization techniques, for instance, by bulk or solution polymerization wherein the solvent can be, for example an alcohol, a glycol or a glycol ether.

The polymerization is preferably effected in the presence of a catalyst such as benzoyl peroxide, lauroyl peroxide or azo-bis-isobutyronitrile, the catalyst being present in the reaction mass in amounts ranging from about 0.5–5 and preferably, about 0.9–3 weight percent of the weight of starting monomers.

Allyl and methallyl esters usefully employed in producing the film-forming copolymers incorporated into the hair set lacquers and lotions of this invention are those having the formula

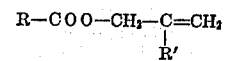

wherein R is an alkyl radical containing 1 to 22 carbon atoms, R' represents hydrogen or a methyl radical. Representative of preferred allyl and methallyl esters are allyl acetate, allyl laurate, allyl stearate, methallyl behenate, methallyl stearate and allyl isostearate.

Vinyl ethers employed in the present invention have the formula

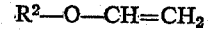

wherein $R^2$ is an alkyl radical containing 4 to 18 carbon atoms. Preferable vinyl ethers include isobutylvinyl ether, octadecyl vinyl ether, cetylvinyl ether and stearyvinyl ether.

The alpha monoolefins used in producing the film-forming copolymers incorporated into the lacquers and lotions of this invention have the formula

wherein $R^3$ is an alkyl radical containing 6 to 26 carbon atoms. Especially useful α-olefins are 1-octene, 1-dodecene, 1-hexadecene, 1-octadecene and 1-eicosene.

The monobasic unsaturated acids containing 4–11 carbon atoms can include those whose hydrocarbon chain is interrupted by an oxygen atom. Particularly useful acids are crotonic acid, allyloxyacetic acid, allyloxy propionic acid, vinyl acetic acid, allyl acetic acid and vinyloxy-acetic acid.

It has also been found that when the film-forming copolymers are produced from monomers which include a mono-basic unsaturated acid, the resulting copolymers can be neutralized by reacting the copolymer with an inorganic or organic base using conventional techniques. The degree of neutralization can range between 50 and 150% of the level corresponding to stoichiometric neutralization.

Among the mineral and organic bases that can be utilized are, for instance, ammonia, 1,3-amino-2-methyl-2-propanediol (AMPD), 1,3-amino-2 ethyl-2-propanediol (AEDP) triethanolamine (TEA) and the like. The neutralization reaction can take place at atmospheric pressure in the presence of a solvent for the copolymer, if desired, such as an alcohol, for instance ethyl alcohol or the like.

Generally, the molecular weight of the copolymers used in the film-forming composition of the invention ranges between about 10,000 and 100,000.

The cosmetic vehicle or carrier employed in combination with the film-forming copolymer to produce the hair set lacquer and lotion of this invention can be any conventional cosmetically acceptable vehicle or carrier such as alcohol, water and their mixtures. Additionally, the hair set lacquer and lotion can be produced in the form of a solution, a gel, a cream or a foam and ideally it can be provided in the form of a sprayable aerosol composition.

For instance, in accordance with the present invention, an aerosol lacquer for the hair can be made by introducing 1 to 4 weight percent of a copolymer such as those described above into a mixture comprising ¼ to ⅓ by weight alcohol such as ethyl alcohol, and ⅔ to ¾ by weight pressurized liquid propellant gas such as trichlorofluoromethane or any other conventional fluoralkane propellant material.

A hair set lotion according to the invention can be made, for example, by introducing 1 to 3% by weight, with reference to the solution, of a copolymer as described, in an aqueous alcohol solution have a titer less than 70° alcohol.

The cosmetic compositions of the invention can also include cosmetic adjuvants of the usual kind such as plasticizers, perfumes, dyes, cationic products to facilitate untangling, non ionic products to ensure peptizing of the perfumes, silicones to enhance the brilliance, or other cosmetic resins.

In the following examples, which further illustrate the present invention, all parts and percentages are given by weight unless otherwise indicated.

EXAMPLE 1

Preparation of a N-vinylpyrrolidone (75%)/allyl stearate (15%)/allyloxy acetic acid (10%) copolymer In a 250-ml. retort fitted with an agitator, a reflux cooler, a thermometer and a nitrogen lead-in tube, there are placed 75 g. N-vinylpyrrolidone, 15 g. allyl stearate, 10 g. allyloxyacetic acid and 1 g. azo-bis-isobutyronitrile. The mixture is heated to 80–90° C. and held at this temperature for 8 hours.

After cooling, there is obtained in quantitative yield a slightly amber viscous copolymer. The acid number of the copolymer which was precipitated by the addition of the reaction mass to petroleum ether is 48.5 (theoretical, 48) and the vscosity of the polymer is 1.23 cps. (in 5% solution at 35° C. in dimethylformamide).

EXAMPLE 2

Preparation of an N-vinylpyrrolidone (85%)/allyl stearate (15%) copolymer

In a 1-liter retort fitted with an agitator, a reflux cooler, a thermometer and a nitrogen lead-in tube there are placed 30 g. allyl stearate, 170 g. N-vinylpyrrolidone, 200 g. ethanol and 1.8 g. azo-bis-isobutyronitrile.

The reaction mixture is heated for 16 hours with solvent reflux at a temperature of 78 to 80° C.

After cooling, the resulting copolymer is precipitated by the addition of the reaction mixture to an excess of petroleum ether. After drying of the precipitate, there is obtained, in a 75% yield, the desired copolymer which has a viscosity of 2.14 cps., in 5% solution in DMF at 35° C.

EXAMPLE 3

Preparation of N-vinylpyrrolidone (80%)/allyl acetate (10%)/allyloxyacetic acid (10%) copolymer In a 1-liter retort provided with an agitator, a reflux cooler, a thermometer and a nitrogen lead-in tube there are placed 160 g. N-vinylpyrrolidone, 20 g. allyl acetate, 20 g. allyloxyacetic acid, 200 g. ethanol and 4.8 g. azo-bis-iso-butyronitrile.

The mixture is heated at a temperature of 75 to 80° C. with solvent reflux for 17 hours.

The copolymer is precipitated by the addition of the reaction mixture to an excess of petroleum ether. After drying of the precipitate, a copolymer yield of 78% is attained. Its acid number is 46.5 (theoretical, 48). Its viscosity is 1.44 cps. in 5% solution in DMF at 35° C.

EXAMPLE 4

Preparation of an N-vinylpyrrolidone (85%)/octadecyl vinyl ether (15%) copolymer In a 1-liter retort fitted with an agitator, a reflux cooler, a thermometer and a nitrogen lead-in tube there are placed 170 g. N-vinylpyrrolidone, 30 g. octadecyl vinyl ether, 200 g. ethanol and 1.4 g. azo-bis-isobutyronitrile.

The mixture is heated at a temperature of 78 to 82° C. with solvent reflux for 16 hours.

After cooling, there is obtained, in quantitative yield, a pale amber viscous polymer. The viscosity of the polymer which was precipitated by the addition of the reaction mass into petroleum ether is 2.88 cps. in 5% solution in DMF at 35° C.

EXAMPLE 5

Preparation of an N-vinylpyrrolidone (85%)/1 octadecene (15%) copolymer

In a 1-liter retort provided with an agitator, a reflux cooler, a thermometer and a nitrogen lead-in tube, there are placed 170 g. N-vinylpyrrolidone, 30 g. 1-octadecene, 200 g. ethanol and 1.4 g. azo-bis-isobutyronitrile.

The mixture is heated at a temperature of 78 to 80° C. with solvent reflux for 16 hours.

After cooling there is obtained in quantitative yield a pale amber viscous polymer which is precipitated by the addition of the reaction mass to petroleum ether. The viscosity of the polymer is 2.28 cps., in 5% solution in DMF at 35° C.

EXAMPLE 6

Preparation of the N-vinylpyrrolidone (75%)/allyl stearate (15%)/crotonic acid (10%) copolymer In a 1-liter retort fitted with an agitator, a reflux cooler, a thermometer and a nitrogen lead-in tube there are placed 150 g. N-vinylpyrrolidone, 30 g. allyl stearate, 20 g. crotonic acid, 200 g. ethanol and 1.4 g. azo-bis-isobutyronitrile.

The mixture is heated at a temperature of 75 to 80° C. with solvent reflux for 16 hours.

After cooling, there is obtained in quantitative yield a very pale amber viscous polymer which is precipitated by the addition of the reaction mass in petroleum ether. The viscosity of the polymer is 1.51 cps., in 5% solution in DMF at 35° C. and its acid number is 29.12.

EXAMPLE 7

Preparation of the N-vinylpyrrolidone (85%)/methallyl stearate (15%) copolymer

In a 1-liter retort equipped with an agitator, a reflux cooler, a thermometer and a nitrogen lead-in tube there are placed 170 g. N-vinylpyrrolidone, 30 g. methallyl stearate, 200 g. ethanol and 1.4 g. azo-bis-isobutyronitrile.

The mixture is heated at a temperature of 78 to 80° C. with solvent reflux for 16 hours.

After cooling, there is obtained in quantitative yield a very pale amber viscous polymer which is precipitated by the addition of the reaction mass into petroleum ether. The viscosity of the polymer is 3.66 cps., in 5% solution in DMF at 35° C.

EXAMPLE 8

Preparation of a N-vinylpyrrolidone (75%)/1-octadecene (15%)/crotonic acid (10%) copolymer In a 250-ml. retort fitted with an agitator, a reflux cooler, a thermometer and a nitrogen lead-in tube, there are placed 75 g. N-vinylpyrrolidone, 15 g. 1-octadecene, 10 g. crotonic acid, 100 g. ethanol and 2 g. azo-bis-isobutyronitrile.

The mixture is heated for 24 hours with reflux at a temperature of 78 to 82° C. After cooling, the copolymer is precipitated by addition of the reaction mixture to petroleum ether. After drying the precipitate a copolymer yield of 70% is attained, the copolymer being in the form of a white powder. Its acid number is 63.75 (theoretical, 65) and its viscosity is 1.46 cps. in 5% solution in DMF at 35° C.

EXAMPLE 9

Preparation of a N-vinylpyrrolidone (85%)/allyl stearate (10%)/allyl acetic acid (5%) copolymer In a 250-ml. retort fitted with an agitator, reflux cooler, a thermometer and a nitrogen lead-in tube, there are placed 85 g. of N-vinylpyrrolidone, 10 g. of allyl stearate, 5 g. of allylacetic acid, 100 g. of ethanol and 2 g. of azo-bis-isobutyronitrile.

The mixture is heated for 24 hours with reflux at a temperature of 75 to 82° C. After cooling, the copolymer is precipitated by addition of the reaction mixture to petroleum ether. After drying the precipitate, a copolymer yield of 60% is attained, the copolymer being in the form of a white powder. Its acid number is 11.5 (theoretical, 28) and its viscosity is 1.86 cp. in 5% solution in DMF at 35° C.

EXAMPLE 10

Preparation of N-vinylpyrrolidone (80%)/octadecyl vinyl ether (15%)/vinyl acetic acid (5%) copolymer In a 250-ml. retort fitted with an agitator, a reflux cooler, a thermometer and a nitrogen lead-in tube, there are placed 80 g. of N-vinylpyrrolidone, 15 g. of octadecyl vinyl ether, 5 g. of vinyl acetic acid, 100 g. of ethanol and 2 g. of azo-bis-isobutyronitrile.

The mixture is heated for 24 hours with reflux at a temperature of 78 to 82° C. After cooling, the copolymer is precipitated by addition of the reaction mixture to petroleum ether. After drying the precipitate, a copolymer yield of 48% is attained, the copolymer being in the form of a white powder. Its acid number is 20.88 (theoretical, 32.5) and its viscosity is 1.63 cp. in 5% solution in DMF at 35° C.

EXAMPLE 11

Preparation of N-vinylpyrrolidone (90%)/1-octadecene (10%) copolymer

In a 250-ml. retort fitted with an agitator, a reflux cooler, a thermometer and a nitrogen lead-in tube, there are placed 90 g. of N-vinylpyrrolidone, 10 g. of 1-octadecene, 100 g. of ethanol and 2 g. of azo-bis-isobutyronitrile.

The mixture is heated for 24 hours with reflux at a temperature of 78 to 82° C. After cooling, the copolymer is precipitated by addition of the reaction mixture to petroleum ether. After drying the precipitate, a copolymer yield of 53% is attained, the copolymer being in the form of a white powder. Its viscosity is 2.42 cps. in 5% solution in DMF at 35° C.

EXAMPLE 12

Preparation of a N-vinylpyrrolidone (50%)/allyl stearate (40%)/crotonic acid (10%) copolymer In a 250-ml. retort fitted with an agitator, a reflux cooler, a thermometer and a nitrogen lead-in tube, there are placed 50 g. of N-vinylpyrrolidone, 40 g. of allyl stearate, 10 g. of crotonic acid, 100 g. of ethanol and 2 g. of azo-bis-isobuyronitrile.

The mixture is heated for 24 hours with reflux at a temperature of 75 to 82° C. After cooling, the copolymer is precipitated by addition of the reaction mixture to petroleum ether. After drying the precipitate, a copolymer yield of 40% is attained, the copolymer being in the form of a white powder. Its acid number is 69.88 (theoretical, 65) and its viscosity is 1.27 cp. in 5% solution in DMF at 35° C.

Particularly useful copolymers for preparing the hair set lacquers and lotions of this invention are those obtained by copolymerization of 85–90 weight percent N-vinylpyrrolidone and 10–15% of another monomer selected from the group consisting of allyl stearate, octadecyl vinyl ether, 1-octadecene and methallyl stearate and those obtained by copolymerization of 50 to 80 weight percent N-vinylpyrrolidone, 10–40 weight percent of a monomer selected from the group consisting of allyl stearate, allyl acetate, octadecyl vinyl ether and 1-octadecene, and 5–10 weight percent of another monomer selected from the group consisting of allyl oxyacetic acid, crotonic acid, vinyl acetic acid and allyl acetic acid.

Additionally, copolymers containing 40 weight percent N-vinylpyrrolidone with 60 weight percent allyl acetate, allyl laurate, allyl stearate, methallyl behenate, methallyl stearate and allyl isostearate are also prepared in the manner essentially as outlined in Example 2.

Further, Example 6 is repeated except that after production of the copolymer it is neutralized by addition thereto of an alkaline agent such as ammonia in amounts sufficient to neutralize about 50% of the level corresponding to stoichiometric neutralization.

Other copolymers similar to that produced in Example 6 are prepared using instead, essentially equivalent amounts of allyloxacetic acid, allyloxy propionic acid, vinyl acetic acid, allyl acetic acid and vinyloxyacetic acids so that the resulting copolymer contains as little as about 3 weight percent and as much as about 20 weight percent of the acid. The amount of the N-vinylpyrrolidone present in these copolymers ranged from about 40 to about 90 weight percent, while monomers such as allyl esters and the like were present in amounts of about 5 to 40 weight percent.

Neutralization of such resulting copolymer is also effected by reaction with such alkaline agents as 1,3-amino-2-methyl-2-propanediol, triethanolamine and 1,3-amino-2-ethyl 2-propanediol.

The following examples illustrate the production, according to the present invention, of hair lacquers and lotions.

EXAMPLE 13

The following solution is prepared:

copolymer described in Example 1: 3 g.
1,3-amino-2-methyl-2-propanediol sufficient for 100% neutralization
ethyl alcohol in sufficient quantity to make: 50°
water in sufficient quantity to make up: 100 ml.

This solution is applied to the hair for wave set, and a plastic very brilliant film is obtained which imparts excellent qualities to the hair set.

EXAMPLE 14

The following solution is prepared:

copolymer described in Example 2: 3 g.
ethyl alcohol in sufficient quantity to make: 50°
water in sufficient quantity to make up: 100 ml.

This solution used as hair set lotion produces a nonadhering film that does not powder and that is especially brilliant.

EXAMPLE 15

To make an aerosol lacquer for the hair, a solution of the following composition is prepared:

copolymer described in Example 1: 7.2 g.
triethanolamine in sufficient quantity for 100% neutralization
perfume: 0.3 g.
absolute ethanol in sufficient quantity to make up: 100 g.

25 g. of this solution are stored in an aerosol can with 47 g. of trichloromonofluoromethane and 28 g. of dichlorodifluoromethane.

By spraying, a lacquer is obtained which makes the hair very brilliant.

EXAMPLE 16

To make an aerosol lacquer for the hair, a solution of the following composition is prepared:

copolymer described in Example 2: 8 g.
perfume: 0.2 g.
absolute ethanol in sufficient quantity to make up: 100 g.

25 g. of this solution are stored in an aerosol can with 47 g. of trichloromonofluoromethane and 28 g. of dichlorodifluoromethane.

After spraying, the hair is brilliant, not sticky and the lacquer is readily brushed out.

EXAMPLE 17

The following solution is prepared:

copolymer described in Example 8: 3 g.
1,3-amino-2-methyl-2-propanediol in sufficient quantity for 100% neutralization
ethyl alcohol in sufficient quantity to make: 50°
water in sufficient quantity to make up: 100 ml.

This solution is applied to the hair as a hair set lotion and a very brilliant plastic film is obtained which imparts excellent qualities to the hair.

EXAMPLE 18

To make an aerosol lacquer for the hair, a solution of the following composition is prepared:

copolymer described in Example 11: 7.2 g.
perfume: 0.3 g.
absolute ethanol alcohol in sufficient quantity to make up: 100 g.

25 g. of this solution are stored in an aerosol can with 47 grams of trichloromonofluoromethane and 28 g. of dichlorodifluoromethane.

After spraying, the hair is brilliant and the lacquer is easily removed by brushing or shampooing.

EXAMPLE 19

The following solution is prepared:

copolymer described in Example 10: 3 g.
1,3-amino-2-methyl-2-propanediol in amounts sufficient for 100% neutralization
ethyl alcohol in amount sufficient to make: 50°
water in sufficient quantity to make up: 100 ml.

This solution is applied to the hair for wave set and a plastic, very brilliant film is obtained which imparts excellent qualities to the hair set.

EXAMPLE 20

To make an aerosol lacquer for the hair, a solution of the following composition is prepared:

copolymer described in Example 12: 7.2 g.
triethanolamine in sufficient quantity for 100% neutralization
perfume: 0.3 g.
isopropyl alcohol in sufficient quantity to make up: 100 g.

25 g. of this solution are stored in an aerosol can with 47 grams of trichloromonofluoromethane and 28 grams of dichlorodifluoromethane.

By spraying, a lacquer is obtained which makes the hair very brilliant.

EXAMPLE 21

To make an aerosol lacquer for the hair, a solution of the following composition is prepared:

copolymer described in Example 9: 9.2 g.
triethanolamine in sufficient quantity for 100% neutralization
perfume: 0.3 g.
isopropyl alcohol in sufficient quantity to make up 100 g.

25 g. of this solution are stored in an aerosol can with 47 grams of trichloromonofluoromethane and 28 grams of dichlorodifluoromethane.

By spraying, a lacquer is obtained which makes the hair very brilliant.

What is claimed is:

1. A hair lacquer or lotion composition consisting essentially of in a solvent selected from the group consisting of ethanol, isopropanol, an aqueous solution of ethanol and an aqueous solution of isopropanol, 1–3 percent by weight of a copolymer of 85 to 90 percent by weight of N-vinylpyrrolidone and 15 to 10 percent by weight of a monomer selected from the group consisting of allyl stearate, octadecyl vinyl ether, 1-octadecene and methallyl stearate, said copolymer having a molecular weight ranging from about 10,000 to 100,000.

2. A sprayable aerosol hair lacquer composition consisting essentially of a mixture of from ¼ to ⅓ by weight of an alcohol selected from the group consisting of ethanol and isopropanol with ⅔ to ¾ by weight pressurized liquid propellant gas and 1 to 4 percent by weight of said mixture of a copolymer of 85 to 90 percent by weight of N-vinylpyrrolidone and 15 to 10 percent by weight of a monomer selected from the group consisting of allyl stearate, octadecyl vinyl ether, 1-octadecene and methallyl stearate, said copolymer having a molecular weight ranging from about 10,000 to 100,000.

3. Composition as in claim 2 wherein the propellant gas is a fluorochlorinated hydrocarbon.

4. A hair lacquer or lotion composition comprising in a solvent selected from the group consisting of ethanol, isopropanol, an aqueous solution of ethanol and an aqueous solution of isopropanol, 1 to 3 percent by weight of a copolymer of 40 to 90 percent by weight of N-vinyl pyrrolidone, 40 to 5 percent by weight of a monomer selected from the group consisting of allyl acetate, allyl laurate, allyl stearate, methallyl behenate, methallyl stearate, allyl isostearate, isobutylvinyl ether, octadecyl vinyl ether, cetyl vinyl ether, stearyl vinyl ether, 1-octene, 1-dodecene, 1-hexadecene, 1-octadecene and 1-eicosene, and 20 to 3 percent by weight of an unsaturated acid selected from the group consisting of crotonic acid, allyloxyacetic acid, allyloxypropionic acid, vinylacetic acid, allylacetic acid and vinyloxyacetic acid, said copolymer having a molecular weight ranging from about 10,000 to 100,000.

5. Composition as in claim 4 wherein the copolymer is neutralized by an alkaline agent in sufficient amounts so that a level of neutralization ranges between 50 and 150% of the level that corresponds to stoichiometry.

6. Composition as in claim 5 wherein the alkaline agent is selected from the group consisting of ammonia, 1,3 amino-2 methyl-2 propanediol, 1,3 amino-2 ethyl-2 propanediol and triethanolamine.

7. The composition of claim 4 wherein said copolymer is a copolymer of 50 to 80% N-vinylpyrrolidone, 10–40% of a monomer selected from the group consisting of allyl stearate, allyl acetate, octadecyl vinyl ether, 1-octadecene and 5–10% of an unsaturated monobasic carboxylic acid selected from the group consisting of allyloxyacetic acid, crotonic acid, vinyl acetic acid and allyl acetic acid.

8. A sprayable aerosol hair lacquer composition comprising a mixture of ¼ to ⅓ by weight of an alcohol selected from the group consisting of ethanol and isopropanol with ⅔ to ¾ by weight pressurized liquid propellant gas and 1 to 4 percent by weight of said mixture of a copolymer of 40 to 90 percent by weight of N-vinylpyrrolidone, 40 to 5 percent by weight of a monomer selected from the group consisting of allyl acetate, allyl laurate, allyl stearate, methallyl behenate, methallyl stearate, allyl isostearate, isobutylvinyl ether, octadecyl vinyl ether, cetyl vinyl ether, stearyl vinyl ether, 1-octene, 1-dodecene, 1-hexadecene, 1-octadecene and 1-eicosene, and 20 to 3 percent by weight of an unsaturated acid selected from the group consisting of crotonic acid, allyloxyacetic acid, allyloxypropionic acid, vinylacetic acid, allylacetic acid and vinyloxyacetic acid, said copolymer having a molecular weight ranging from about 10,000 to 100,000.

9. Composition as in claim 8 wherein the propellant gas is a fluorochlorinated hydrocarbon.

References Cited

UNITED STATES PATENTS

| | | | |
|---|---|---|---|
| 2,723,248 | 11/1955 | Wright | 424—47 X |
| 2,941,980 | 6/1960 | Robinson | 424—71 X |
| 3,145,147 | 8/1964 | Glickman | 424—47 |
| 3,222,329 | 12/1965 | Grosser et al. | 260—80.72 |
| 3,296,231 | 1/1967 | Resz et al. | 260—80.72 |
| 3,405,084 | 10/1968 | Bohac et al. | 260—80.72 X |
| 3,406,238 | 10/1968 | Freyermuth et al. | 424—70 |
| 3,427,296 | 2/1969 | Anspon et al. | 260—80.72 X |

JEROME D. GOLDBERG, Primary Examiner

V. C. CLARKE, Assistant Examiner

U.S. Cl. X.R.

260—29.6 HN, 29.6 ME, 33.4 R, 80.3 R, 80.3 E, 80.72, 85.7, 88.1; 424—Dig. 1 and 2, 47, 71

UNITED STATES PATENT OFFICE
CERTIFICATE OF CORRECTION

Patent No. 3,806,317    Dated April 23, 1974

Inventor(s) Andre Viout and Christos Papantoniou

It is certified that error appears in the above-identified patent and that said Letters Patent are hereby corrected as shown below:

In the Heading:

Claims priority, application Luxembourg, April 8, 1969, 58,383/69

Signed and sealed this 1st day of October 1974.

(SEAL)
Attest:

McCOY M. GIBSON JR.
Attesting Officer

C. MARSHALL DANN
Commissioner of Patents